May 2, 1933. H. E. IVES 1,907,114
ELECTROOPTICAL SYSTEM
Filed Dec. 6, 1929 2 Sheets-Sheet 2

INVENTOR
H. E. IVES
BY
Stanley B. Kent
ATTORNEY

Patented May 2, 1933

1,907,114

UNITED STATES PATENT OFFICE

HERBERT E. IVES, OF MONTCLAIR, NEW JERSEY, ASSIGNOR TO BELL TELEPHONE LABORATORIES, INCORPORATED, OF NEW YORK, N. Y., A CORPORATION OF NEW YORK

ELECTROOPTICAL SYSTEM

Application filed December 6, 1929. Serial No. 412,006.

This invention relates to electro-optical systems and more particularly to systems comprising selenium or like resistance types of light sensitive cells.

An object of the invention is to improve the operation of such systems.

In an example of practice illustrative of the invention, a selenium cell is associated with a helium glow discharge lamp by an electrical transmission channel, the output energy of which is substantially proportional to the input energy. In such a system variations of light incident on the cell produce substantially similar variations of light emitted by the lamp with a minimum of energy required in the electrical channel since the current output from the cell varies substantially as the square root of the incident light and the light emitted by the lamp varies substantially as the square of the impressed electrical energy. Preferably the cell is cooled to a low temperature, for example, that of liquid air in order to reduce or obviate dark current and lag, making the system suitable for image production of still or moving objects.

The invention is also applicable where the originating and utilized energy is electrical and the intermediate transfer of energy is by light such as occurs in sound recording and reproducing. The invention is capable of still other uses as will hereinafter appear.

A more detailed description of the invention follows, having reference to the accompanying drawings.

Figure 1:
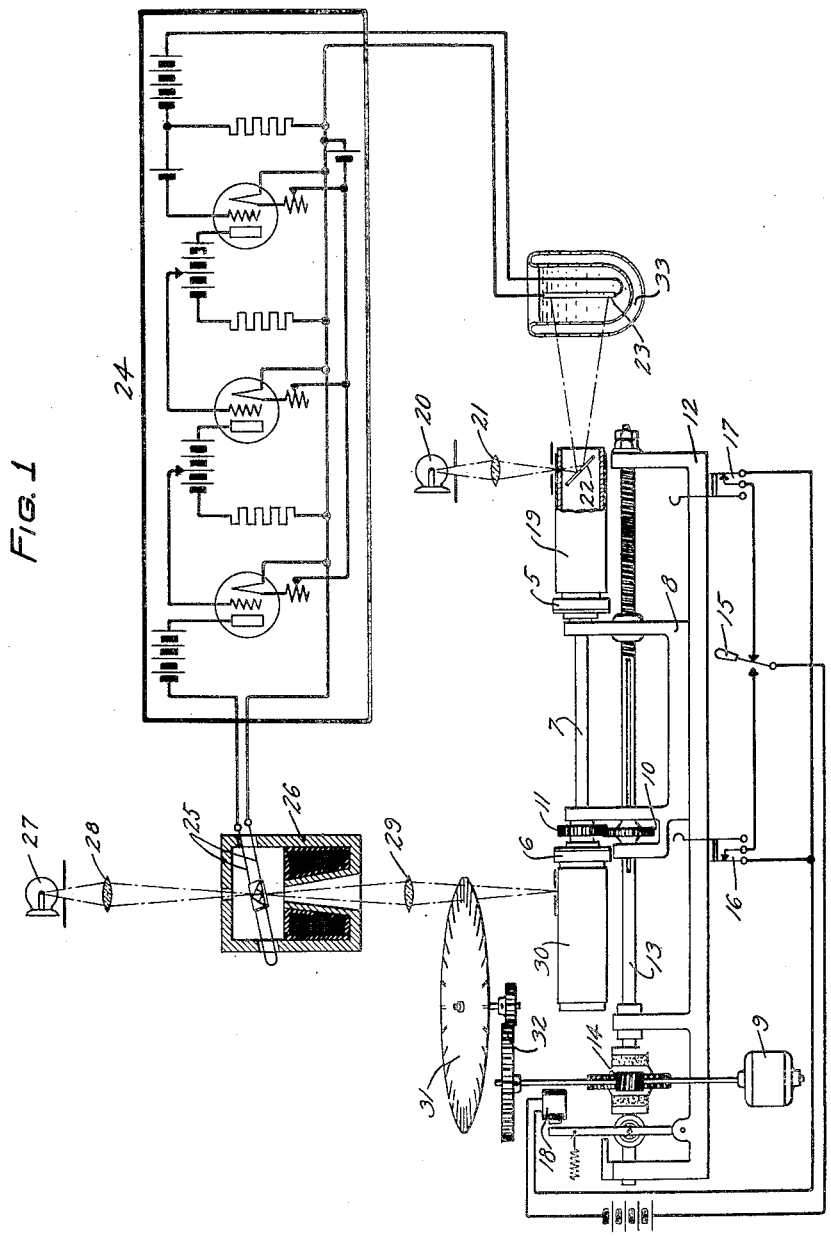
Fig. 1 illustrates one embodiment of the invention in an electro-optical system for the production of pictures suitable for the contact exposure of printing plates.

Referring now to Fig. 1 a scanning drum 5 and an exposure drum 6 are both mounted on a shaft 7 which is carried by a longitudinally movable carriage 8. The power for rotating the drums is supplied by a motor 9 through gears 10 and 11. The carriage 8 slides on guides secured to a frame 12 and is moved longitudinally by threaded engagement with the shaft 13 which is driven by motor 9 through a clutch and gears 14. The switches 15, 16 and 17 which control the clutch magnet 18, provide for the starting and automatic stopping of the longitudinal movement of the carriage. For further details of this drum moving mechanism, reference may be had to Patent No. 1,649,309 issued to H. E. Ives on November 15, 1927.

A form of picture suitable for contact exposure of printing plates is one made up of lines of dots of various sizes representative of tone values of the original picture. A picture of this kind is produced by the arrangement in Fig. 1.

A transparency 19 of the original picture is mounted on the scanning drum 5. Light from a source 20 is concentrated by lens 21 on an elemental area of the transparency. The light passing through the transparency is reflected from a mirror 22 upon selenium cell 23. The current through cell 23 is amplified by a three stage vacuum tube amplifier 24 the output from which is impressed upon movable strings 25 of an electromagnetic light valve 26. Each of the strings 25 is provided with a screen having a V-shaped edge so that the aperture formed thereby is square. Light from source 27 is directed by lens 28 upon this aperture. Lens 29 forms an image of the aperture on a light sensitive record blank 30 mounted on the exposure drum 6. The light beam from the lens 29 is intermittently interrupted by a rotating sectored disc 31 driven through suitable gearing 32 by the motor 9. For further details of the light valve and its associated optical elements, reference is made to Patent No. 1,631,963 issued to H. E. Ives on June 14, 1927.

The selenium cell 23 is immersed in liquid air in the Dewar flask 33. A portion of the flask is left clear to provide a window for the light beam from the light source 20.

The selenium cell has the desirable characteristic of large current response to changes of light incident thereon and, when cooled to the temperature of liquid air, is substantially free from the undesirable characteristics such as drift and lag. The current in the cell, however, varies as the square root of the intensity of the light incident thereon. In the system of Fig. 1 the amplified current from the cell 23 energizes the light valve 26, the light through which varies as the square of the current flowing in the valve strings 25. In this system therefore the intensity of the light incident upon the record blank 30 is directly proportional to the light incident on the cell 23 and faithful reproduction results. Furthermore, the current values in the amplifier are very much less than would be the case were the current in the cell directly proportional to the light incident thereon.

Figure 2:
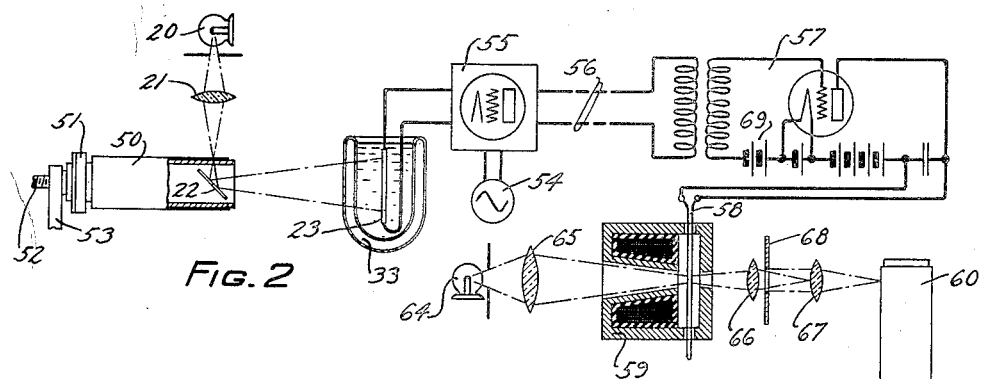
Fig. 2 is another embodiment in an electro-optical picture transmission system.

Referring now to Fig. 2, a similar type of cell is employed for picture transmission. A transparency 50 of the originating picture is mounted on a scanning drum 51 which may be rotated by any suitable means (not shown). Such rotation produces a longitudinal movement of the drum by means of the engagement of threaded shaft 52 with support 53. In this system the current from the selenium cell 23 is used to modulate a carrier current from a source of carrier current 54 in the modulator 55. This modulated carrier current is transmitted over a transmission line 56 to a receiving station where it is impressed upon the input circuit of a vacuum tube detector 57. The output current from this detector is impressed upon the strings 58 of light valve 59 to control the exposure of a light sensitive record blank 60 mounted on a drum 61 which is adapted to be rotated in synchronism with the drum 51 by any suitable means (not shown). The rotation of the drum 61 also causes it to move longitudinally because of the threaded engagement of shaft 62 with support 63. Light from a source 64 is directed by lens 65 upon the aperture formed by the light valve strings 58. An image of this aperture is produced by lens 66 at a point intermediate this lens and the record blank 60. The lens 67 forms an image upon the record blank 60 of an aperture in screen 68 which is located adjacent to the lens 66. As the drums 51 and 61 rotate and move longitudinally the varying current through the selenium cell 23 causes a corresponding variable intensity exposure of the record blank 60.

The amount of light passing through the aperture of light valve 59 is directly proportional to the current impressed on the strings 58. As noted in connection with the system of Fig. 1, the current through cell 23 varies as the square root of the intensity of the light incident thereon and therefore the amplitude of the modulated carrier current impressed upon the detector 57 also varies as the square root of the intensity of the light incident upon the selenium cell 23. The detector 57, however, is given such a bias by the battery 69 that the current in its output circuit varies as the square of the voltage impressed upon its input circuit by current from the transmission line 56.

Figure 3:
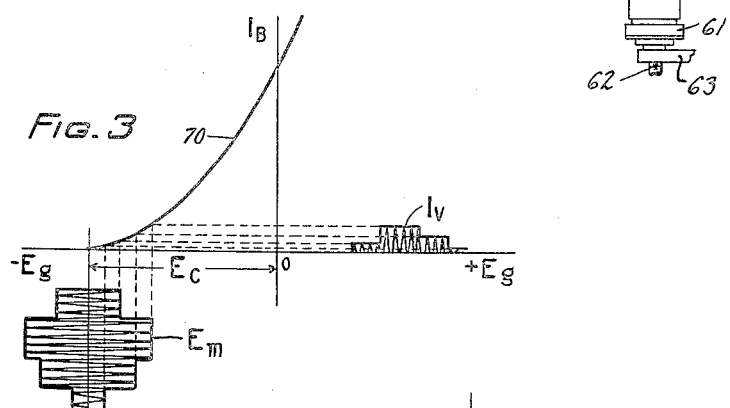
Fig. 3 shows graphs which are explanatory of the system of Fig. 2.

This operation is illustrated by Fig. 3. Where the voltage of battery 69 is represented by $E_c$ and graph 70 is the grid voltage versus plate current characteristic of the detector 57. The envelope of the incoming modulated carrier wave is represented by $E_m$ and the detected output current which is impressed upon the light valve strings 58 is represented by the graph $I_v$. Since the graph 70 of the grid voltage versus plate current characteristic at its lower portion varies substantially as the square of the reduction in grid voltage, the detected current $I_v$ varies as the square of the amplitude of the incoming modulated carrier wave.

Figure 4:
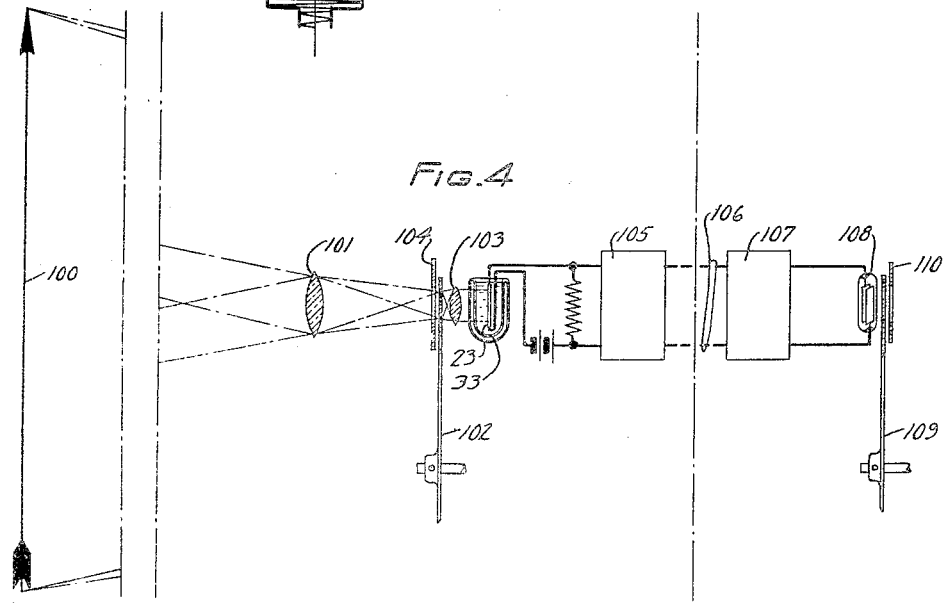
Fig. 4 shows the invention embodied in a television system.

In Fig. 4 a television system employing direct scanning is shown. An object field represented by the arrow 100 is imaged by the lens 101 upon a scanning disc 102. The scanning disc 102 is provided with a plurality of scanning apertures arranged in a spiral in well known manner. Lens 103 forms an image of the lens 101 on the selenium cell 23. The effective size of the image is determined by an aperture in a screen 104. Current from the selenium cell 23 is impressed upon an amplifier 105 and transmitted over line 106 to an amplifier 107 at the receiving station, the output current from which is impressed upon a helium glow discharge lamp 108. The variations in intensity of the light produced by the lamp 108 is viewed through a scanning disc 109 and an aperture in screen 110.

The intensity of the negative glow discharge in the helium lamp 108 varies as the square of the current impressed thereon. As noted in connection with the description of the other embodiments of the invention the current through the cell 23 varies as the square root of the intensity of the light incident on the cell. Consequently the light produced by the helium lamp 108 is directly proportional to the light incident on the selenium cell 23 and the image produced at the receiver as disc 109 is rotated in synchronism with disc 102 by any suitable means, is a faithful reproduction of the object field 100.

The liquid air cooling of the cell 23 with the resulting practical elimination of lag is particularly important in the television system of Fig. 4, where rapid response to changes of light intensity are essential. Furthermore, the rapid response of the helium lamp to changes of current render it particularly useful in this television system. The cell and the lamp, therefore, cooperate to make possible an efficient television system.

The use of other cells of the resistance type in similar circuits is contemplated. Likewise, other embodiments of the invention than those illustrated are contemplated. The scope of the invention is defined by the appended claims.

What is claimed is:

1. In an electro-optical system means to convert light energy into electrical energy comprising a selenium cell maintained at a temperature of the order of that of liquid air, a second means for converting electrical energy into light energy comprising an electrically energized light producing means in which the light produced is proportional to the square of the electrical energy impressed thereon, and means to energize one of said means by energy proportional to and controlled by the output energy of the other of said means.

2. In a television system, a selenium cell maintained at a temperature of the order of that of liquid air, means to illuminate said cell in accordance with the tone values of elemental areas of an object an image of which is to be produced, a helium glow discharge lamp comprising means to convert electrical current variations into light which is proportional to the square of the electrical current, means to energize said lamp in accordance with the current variations in said cell, and means to produce an image of said object by the varying light of said lamp.

3. In a television system, revolving apertured discs at the transmitter and the receiver, means to produce an image on the transmitter disc of an object an image of which is to be produced at the receiver, a selenium cell maintained at the temperature of the order of liquid air and illuminated by light passing through the apertures of the disc at the transmitter, a helium glow discharge lamp comprising means to convert electrical current variations into light which is proportional to the square of the electrical current, means to energize said lamp in accordance with the current variations in said cell, and means to observe said lamp through the apertures of said receiving disc to produce an image of the object.

4. In an electro-optical system, means to convert light energy into electrical energy comprising a resistance type of light reactive cell, a second means for converting electrical energy into light energy comprising a helium glow discharge lamp so constructed and arranged that the light produced is proportional to the square of the electrical energy impressed thereon and the glowing area is substantially constant, and means to energize one of said means by energy proportional to and controlled by the output energy of the other of said means.

5. In an electro-optical system, means to convert light energy into electrical energy which is proportional to the square root of the light energy comprising a resistance type of light reactive cell including selenium, a second means for converting electrical energy into light energy comprising a helium glow discharge lamp so constructed and arranged that the light produced is proportional to the square of the electrical energy impressed thereon and the glowing area is substantially constant, and means to energize one of said means by energy proportional to and controlled by the output energy of the other of said means.

In witness whereof, I hereunto subscribe my name this 4th day of December, 1929.

HERBERT E. IVES.